July 20, 1937.  G. T. NACK  2,087,442
FILTER
Filed Aug. 6, 1936
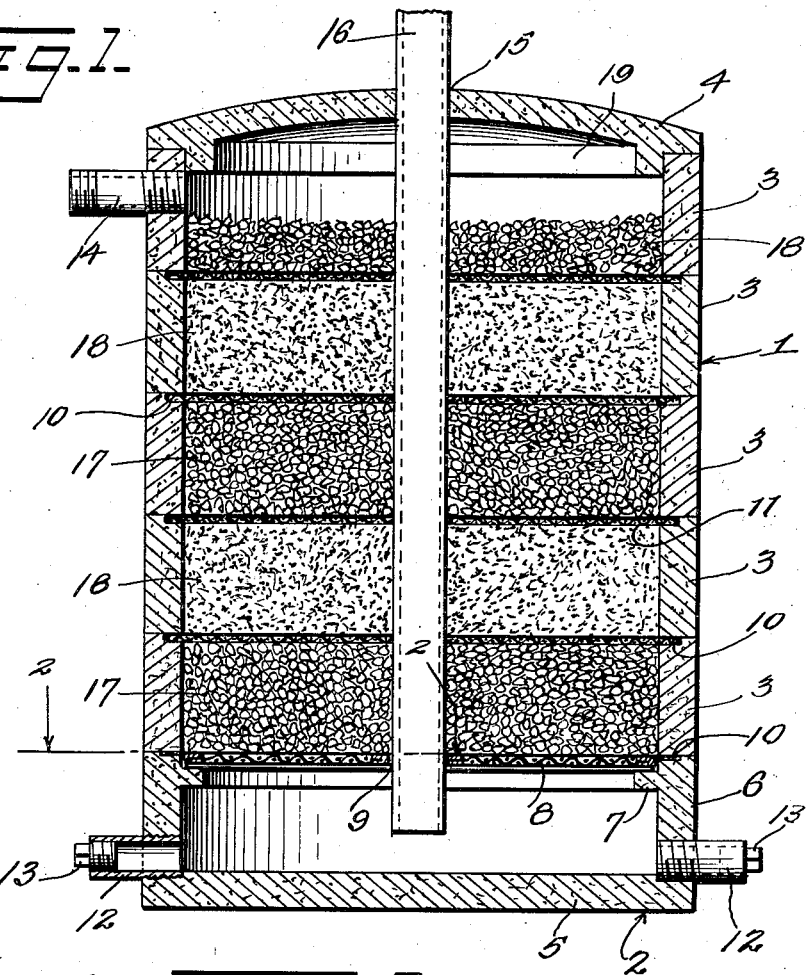
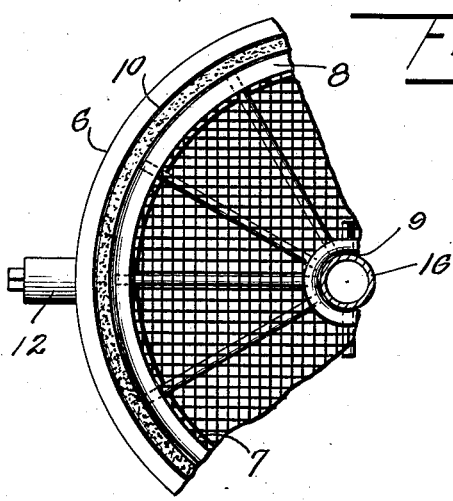
Inventor
*G. T. Nack*
By *Watson E. Coleman*
Attorney Patented July 20, 1937

2,087,442

UNITED STATES PATENT OFFICE 2,087,442

FILTER

George T. Nack, Ivanhoe, Minn., assignor of one-half to James L. Ellis and B. M. Heinzen, both of Ivanhoe, Minn.

Application August 6, 1936, Serial No. 94,673

1 Claim. (Cl. 210—134)

This invention relates to improvements in filtering devices and pertains particularly to an improved gravity filter.

The primary object of the present invention is to provide a novel type of filtering device which may be inexpensively constructed so that it may be used about homes or small establishments for the purpose of filtering water drained from the roofs of buildings or from other sources, the force of gravity of the descending water being employed for effecting its passage through the filtering medium.

Another object of the invention is to provide an improved filter wherein the water or other liquid is introduced at the bottom of the filter and flows upwardly through the filtering medium to the outlet.

A still further object of the invention is to provide a novel filter in which the water or other liquid is delivered into a chamber at the bottom of the filter from which it passes upwardly through the filtering medium, the said bottom chamber constituting a sediment trap which may be readily flushed without disturbing the filtering medium.

The invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claim.

In the drawing:—

Figure 1 is a vertical sectional view through a filter constructed in accordance with the present invention;

Figure 2 is a section on the line 2—2 of Figure 1.

Referring now more particularly to the drawing wherein like numerals of reference indicate corresponding parts throughout the several views, the numeral 1 generally designates the body of the filter which is preferably formed of circular outline. This body is designed to be constructed of cement although it may be made of any other suitable material as will be readily apparent.

The body 1 is made up of a base portion 2, a series of annular sections 3 arranged in concentric relation one upon the other, and a top or cover 4. The bottom section 2 has a bottom wall 5 and a surrounding wall 6 which is provided with the inwardly projecting flange 7 which is arranged with its top surface in a plane slightly below the top edge of the wall 6 so as to receive and support the relatively heavy circular screen which is indicated generally by the numeral 8 and which has a central opening 9 therethrough.

The sections 3 are supported upon the top edge of the wall 6 of the bottom section or portion 2 and as shown these sections 3 are in edge to edge relation and may be secured by any suitable waterproof cement, not shown.

The top surface of the wall 6 and of each of the sections 3 has a depression 10 which extends from the inner side of the wall or section part way across the top and in connection with the wall 6 this recess may be used to receive the cementing material previously referred to while those recesses 10 lying between the abutting edges of the sections 3 receive the edge of an annular screen 11. The screens 11 are of lighter construction than the screen 8 and each of the sections 11 has a central opening therethrough which is aligned with the opening 9 of the screen 8 for the purpose about to be described.

The wall 6 of the bottom section 2 is provided with the two diametrically oppositely positioned pipe sections or nipples 12 each of which opens into the bottom section on the plane of the inner surface of the bottom wall 5 thereof so that any material lying upon the bottom of the section 2 may be readily washed out by discharging water into the bottom section by means of one pipe nipple 12 and allowing it to flow out through the other nipple. These nipples are closed by the plugs 13 when the filtering device is in use.

The top section 3 has extended through the wall thereof the outlet pipe 14 and the top 4 which rests upon the top section 3 has a central opening 15 through which there extends downwardly the inlet pipe 16. This pipe passes through the central openings of the screens 11 and through the opening 9 of the bottom section 8 into the chamber formed by the bottom section 2 beneath the screen 8.

Each of the sections 3, with the exception of the top one, is filled between the screens at its top and bottom, with a filtering substance. It is preferred in the present filtering structure that there be employed alternate layers of gravel and charcoal, the layers or bodies of gravel being indicated by the numeral 17 and those of charcoal being indicated by the numeral 18. The top section 3 is filled with gravel to the plane of the lower part of the outlet pipe 14 so that there is thus provided a filtered water chamber 19 at the top of the filter structure from which the water flows through the pipe 14 to a cistern or other suitable reservoir.

In the use of the present filter structure the pipe 16 is connected with any suitable source of supply such, for example, as the drain pipe from a roof of a building, and the water will pass downwardly into the chamber at the bottom of the filter beneath the screen 8 and will then gradually rise through the layers of filtering material until it reaches the chamber 19 at the top, by which time it will be in a filtered or pure condition. From this it would be apparent that any heavy sediment or any other material in the water when it flows into the filter, will immediately settle in the bottom chamber and will not be discharged into the filtering material so that the filtering material will remain clean over a longer period of time than would be the case if the water were discharged onto the top and allowed to flow downwardly therethrough as is the usual practice. After the bottom chamber has trapped an appreciable quantity of sediment it may be flushed out by opening the pipes 12 in the walls of the bottom section and water discharged through this section by means of these pipes.

While the present filter structure has been referred to particularly as being designed for domestic use it will, of course, be readily appreciated that it may be used for commercial purposes if desired by varying the size of the structure in accordance with the requirements.

I claim:—

In a filtering structure, a receptacle, a plurality of vertically separated screens partitioning the receptacle, the area below the lowermost screen constituting a water receiving chamber, alternate layers of different filtering substances interposed between adjacent ones of the screens, a fluid inlet discharging into the area below the lowermost screen, a fluid outlet at the top of the receptacle, a pair of diametrically opposed tubes in the bottom part of the receptacle, each of said tubes extending through the wall of the receptacle and being flush at its lower side with the bottom of the receptacle, and means for closing said tubes, said tubes facilitating the discharge of flushing fluid thru the receptacle beneath the lowermost screen.

GEORGE T. NACK.